United States Patent
Kim et al.

(10) Patent No.: US 8,348,756 B2
(45) Date of Patent: Jan. 8, 2013

(54) APPARATUS AND METHOD FOR INPUTTING PASSWORD USING GAME

(75) Inventors: Yun Jong Kim, Seoul (KR); Nam Gyu An, Seoul (KR)

(73) Assignee: Neople, Inc. (KR)

( * ) Notice: Subject to any disclaimer, the term of this patent is extended or adjusted under 35 U.S.C. 154(b) by 325 days.

(21) Appl. No.: 12/682,776

(22) PCT Filed: May 26, 2009

(86) PCT No.: PCT/KR2009/002769
§ 371 (c)(1),
(2), (4) Date: Apr. 12, 2010

(87) PCT Pub. No.: WO2009/145540
PCT Pub. Date: Dec. 3, 2009

(65) Prior Publication Data
US 2011/0053685 A1 Mar. 3, 2011

(30) Foreign Application Priority Data
May 29, 2008 (KR) .......................... 10-2008-0050235

(51) Int. Cl.
*A63F 13/10* (2006.01)
(52) U.S. Cl. .......................................... 463/29; 463/30
(58) Field of Classification Search ............... 463/29, 463/30
See application file for complete search history.

(56) References Cited

U.S. PATENT DOCUMENTS
2002/0188872 A1  12/2002  Willeby
2008/0113791 A1   5/2008  Williams et al.

FOREIGN PATENT DOCUMENTS
| EP | 0677801 | 10/1995 |
| KR | 1020020002231 | 9/2002 |
| KR | 100812411 | 4/2008 |
| WO | 2005083638 | 9/2005 |
| WO | 2008029059 | 3/2008 |

OTHER PUBLICATIONS

Taito Corporation, Indiana Jones and the Last Crusade video game, Mar. 1991, see game manual and http://www.youtube.com/watch?v=9wUtuNEt5zg.*

* cited by examiner

*Primary Examiner* — Damon Pierce
(74) *Attorney, Agent, or Firm* — McDonnell Boehnen Hulbert & Berghoff LLP

(57) ABSTRACT

The present invention relates to an apparatus and method for inputting a password using a game. The method includes displaying, on a display unit, a password image corresponding to at least one password information, displaying, on the display unit, at least one obstacle image, displaying, on the display unit, a character image moved based on movement information received from an external input unit, determining whether the character image is in contact with the password image, and controlling a user authentication procedure to be performed based on the at least one password information corresponding to the password image when the character image is in contact with the password image.

18 Claims, 5 Drawing Sheets

APPARATUS AND METHOD FOR INPUTTING PASSWORD USING GAME

TECHNICAL FIELD

The present invention relates to an apparatus and method for inputting a password using a game, and more particularly, to an apparatus and method for inputting a password using a game which may move a character image towards a password image generated in the game to input a password.

BACKGROUND ART

Today, due to development of information communication and Internet technology, businesses primarily conducted offline may be easily and rapidly processed online. For example, in financial institutions such as banks, etc., all deposit-related businesses may be processed online, and in public offices, an application for desired documents and a corresponding document issuance may be performed online.

However, the above described online financial services and online document application services need to be accompanied with a security system corresponding to the services.

As for a conventional security system technique, for example, in a case of a password scheme used in the financial institutions or game industry, a password may be easily hacked through a method in which a spyware recognizes a screen shot and a click of a mouse to capture generated coordinates, and an obtained result is transmitted to a server at a particular e-mail address.

Here, the spyware may designate a computer program that accesses and extracts personal information of browsers without users' consent or knowledge, and passes the information to the third party. For example, the spyware may be installed along with downloaded free software distributed in the Internet or personal computer (PC) communication.

Also, for example, a certificate scheme according to a conventional technique may cause high costs, and a certificate of the certificate scheme may need to be carried by a user. Further, the certificate stored in an e-mail box may be subjected to hacking.

DISCLOSURE OF INVENTION

Technical Problem

An aspect of the present invention provides an apparatus and method for inputting a password using a game, in which the password may be inputted using the game, thereby attracting a user's interest.

An aspect of the present invention provides an apparatus and method for inputting a password using a game, in which a generated location of the password may vary depending on a number of times the password is inputted in the game, thereby reducing a risk of hacking.

An aspect of the present invention provides an apparatus and method for inputting a password using a game, in which reward points may be provided when accurately inputting the password in the game, thereby increasing the use of a password input service.

Technical Solution

According to an aspect of the present invention, there is provided a method for inputting a password using a game, the method including: displaying, on a display unit, a password image corresponding to at least one password information; displaying, on the display unit, at least one obstacle image; displaying, on the display unit, a character image moved based on movement information received from an external input unit; determining whether the character image is in contact with the password image; and controlling a user authentication procedure to be performed based on the at least one password information corresponding to the password image when the character image is in contact with the password image.

According to an aspect of the present invention, there is provided an apparatus for inputting a password using a game, the apparatus including: a password image displaying unit to display, on a display unit, a password image corresponding to at least one password information; an obstacle image displaying unit to display, on the display unit, at least one obstacle image; a character image displaying unit to display, on the display unit, a character image moved based on movement information received from an external input unit; a determining unit to determine whether the character image is in contact with the password image; and an authentication unit to control a user authentication procedure to be performed based on the at least one password information corresponding to the password image when the character image is in contact with the password image.

ADVANTAGEOUS EFFECTS

As described above, according to the present invention, the password may be inputted using the game, thereby attracting a user's interest.

Also, according to the present invention, a generated location of the password may vary depending on a number of times the password is inputted in the game, thereby reducing a risk of hacking.

Also, according to the present invention, reward points may be provided when accurately inputting the password in the game, thereby increasing the use of a password input service.

MODE FOR THE INVENTION

Figure 1:
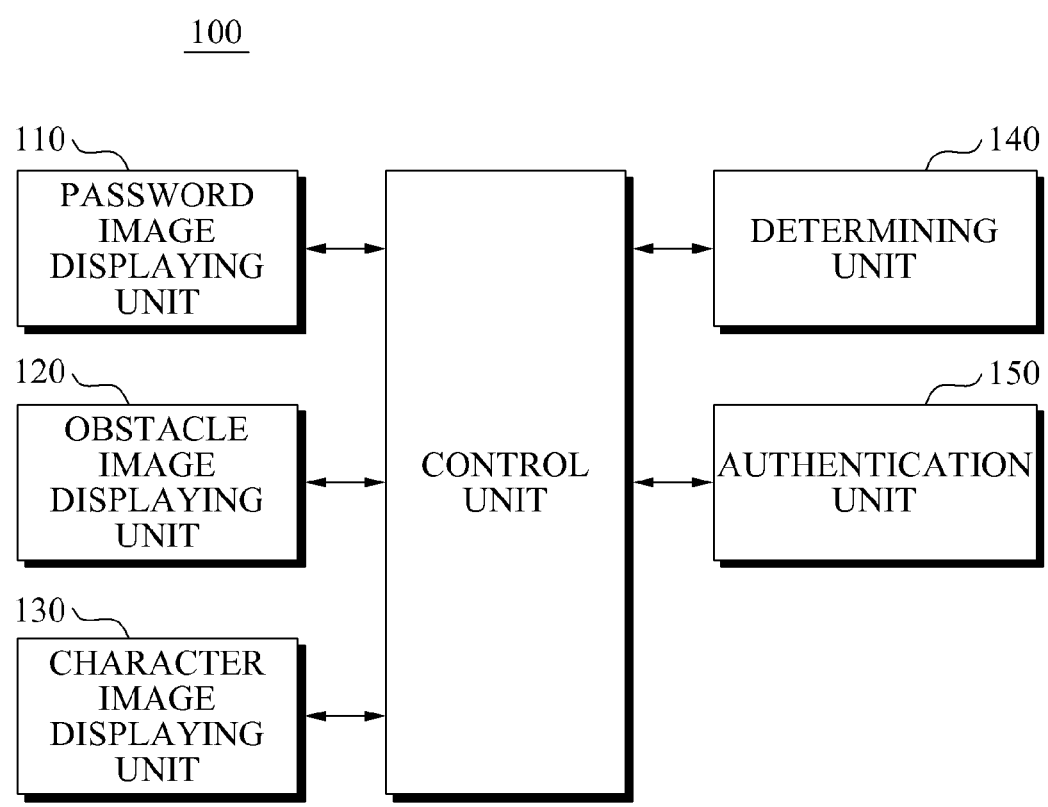
FIG. 1 is a block diagram illustrating a configuration of an apparatus for inputting a password using a game according to example embodiments.

Reference will now be made in detail to embodiments of the present invention, examples of which are illustrated in the accompanying drawings, wherein like reference numerals refer to the like elements throughout. The embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 is a block diagram illustrating a configuration of an apparatus 100 for inputting a password using a game according to example embodiments.

The present invention may be a technique that can be adapted in online security authentication services, and may be applicable in various online password input services such as online services provided in banks or public offices.

For convenience of description, an apparatus and method for inputting a password using a game that can be applicable in an online game will be exemplarily described, and the apparatus and method according to the present invention may be performed in a log-in process of the online game, or may be performed while playing the online game.

Also, the present invention may be performed by a service request of a user, and may be provided to a user as a basic service of each service provider.

Accordingly, the apparatus 100 according to the present invention will be described in detail with reference to FIGS. 1 to 4 in accordance with a method in which a user uses a corresponding service.

First, a password image displaying unit 110 displays, on a display unit, a password image corresponding to at least one password information.

Figure 2:
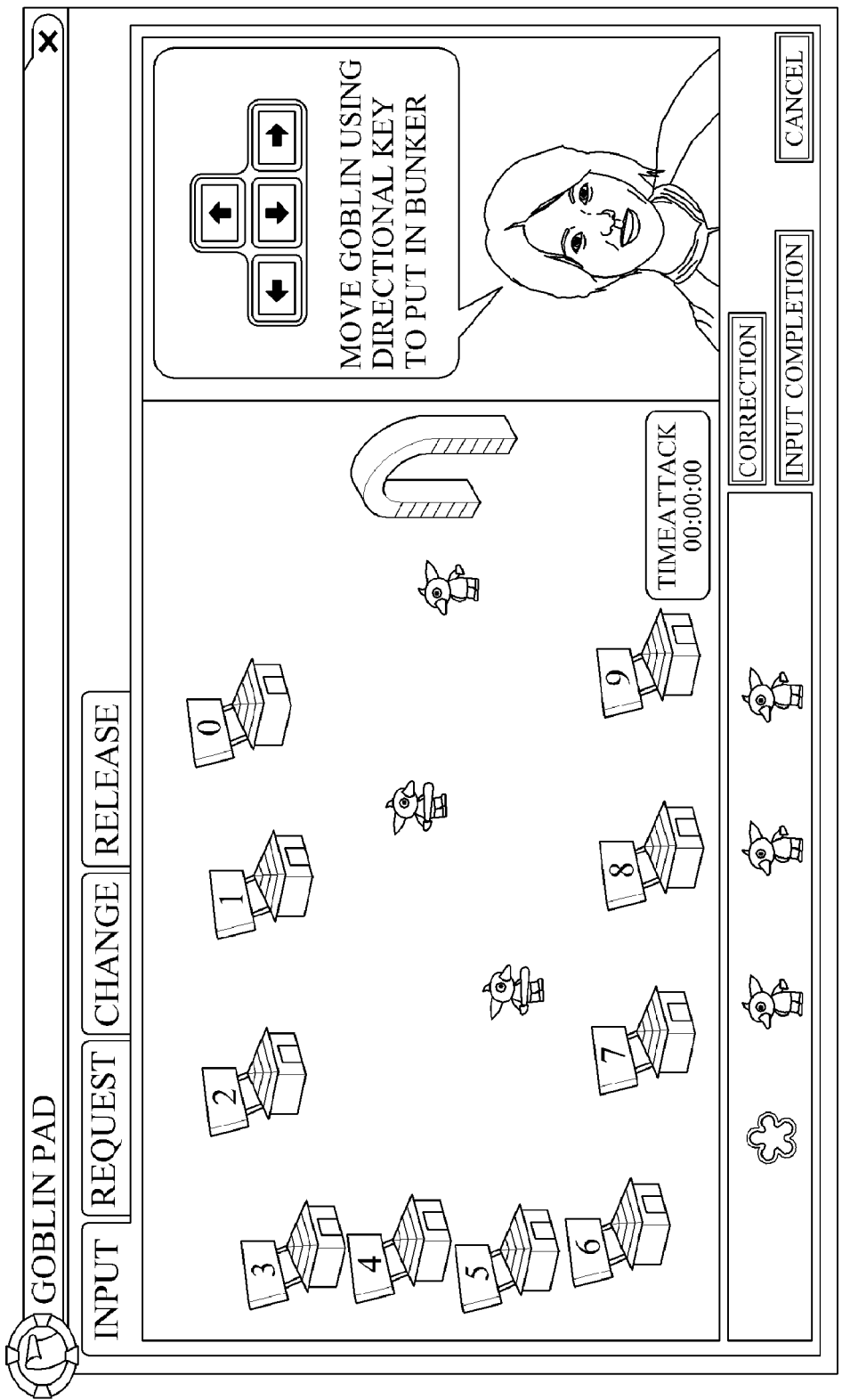
FIG. 2 illustrates an example of a game of inputting a password according to example embodiments.

FIG. 2 illustrates an example of a game of inputting a password according to example embodiments.

In this instance, the password image corresponding to the at least one password information may be a number from 0 to 9 as illustrated in FIG. 2, however, may be changed into a password such as letters depending on a setting of the apparatus 100.

Also, according to the present invention, in order to reduce a risk of hacking, the password information may be converted into a password image corresponding to the password information. Specifically, a password of an existing text type may be easily hacked by program tracking of hackers. However, according to the present invention, the password information of a text type may be provided as the password information of an image type to prevent a risk of hacking.

Also, according to the present invention, each password image may be randomly displayed, which is different from being sequentially displayed in accordance with a predetermined order, thereby reducing the risk of hacking occurring by analyzing the password image generated on a fixed location.

Figure 3:
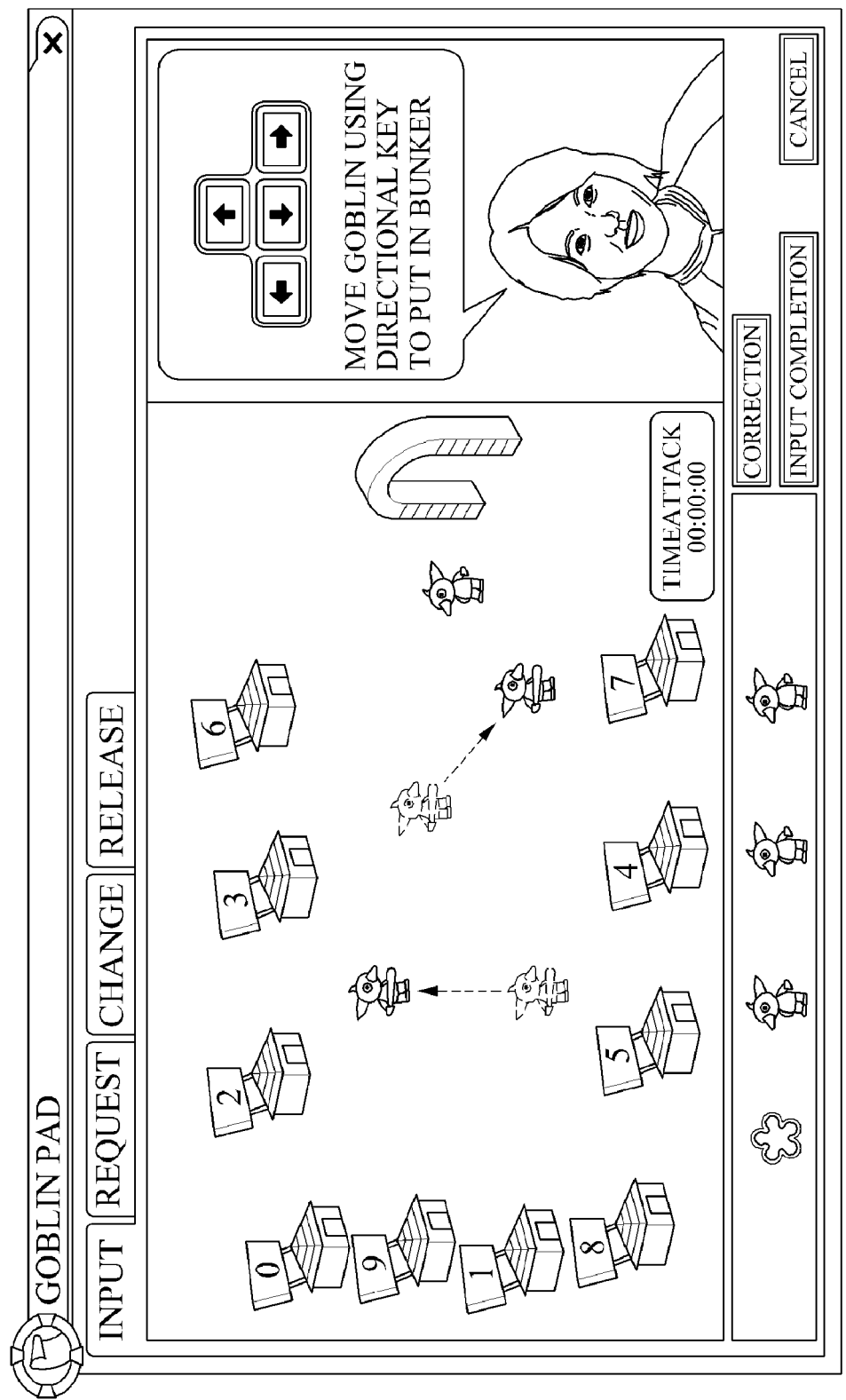
FIG. 3 illustrates a process of generating a password image in the game of inputting the password of FIG. 2.

FIG. 3 illustrates a process of generating a password image in the game of inputting the password of FIG. 2 according to example embodiments.

For example, unlike in FIG. 2, a displayed location of the password image may be changed, thereby enhancing a security for password input.

Next, an obstacle image displaying unit 120 may display at least one obstacle image on the display unit.

Next, a character image displaying unit 130 may display, on the display unit, a character image moved based on movement information received from an external input unit.

In this instance, according to the present invention, the character image may be movable using various external input units such as a keyboard, a mouse, and the like. When using the keyboard in comparison with the mouse, a movement route of the character image may be difficult to be recognized, thereby improving a security level when inputting the password.

According to the present invention, the password may be inputted by moving, towards the password image, the character image directly operated by a user. The character image directly operated by the user may be moved towards the password image while avoiding the obstacle image, and a movement route of the character image may vary for each game, thereby reducing the risk of hacking.

Figure 4:
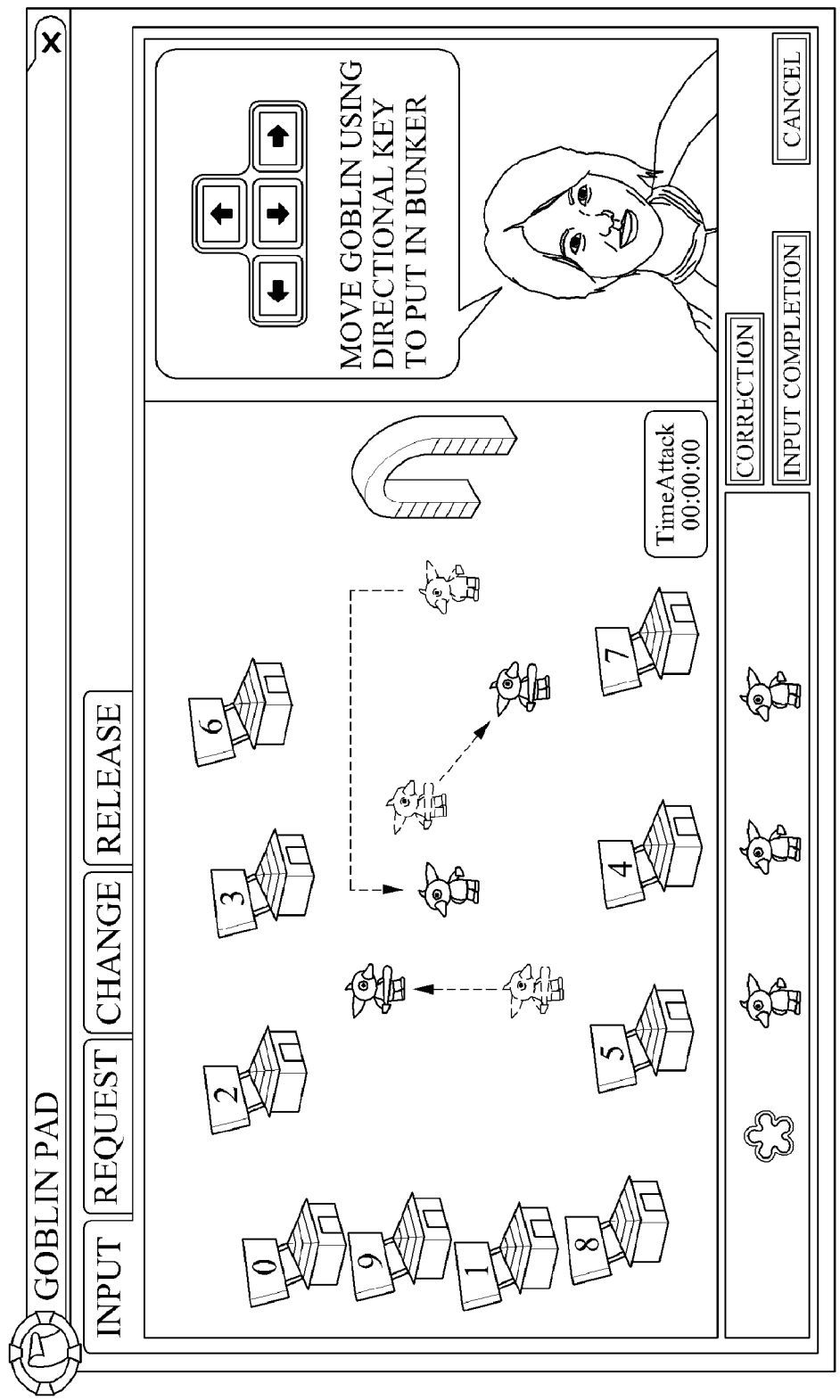
FIG. 4 illustrates an example of movement of a character image in the game of inputting the password of FIG. 2.

FIG. 4 illustrates an example of movement of a character image in the game of inputting the password of FIG. 2 according to example embodiments.

In this instance, as illustrated in FIG. 4, the obstacle image may be fixedly or movably displayed on an initial displayed location according to a predetermined setting to thereby attract a user's interest, and the movement route of the character image may vary to thereby enhance a security level.

Next, a determining unit 140 may determine whether the character image is in contact with the password image.

Specifically, the determining unit 140 may determine the character image to be in contact with the password image when coordinate information of the character image and coordinate information of the password image are matched with each other, and may also determine various algorithms that can be applied in accordance with the above described image contact other than determining whether the character image is in contact with the password image.

Next, an authentication unit 150 may control a user authentication procedure to be performed based on the password information corresponding to the password image when the character image is in contact with the password image.

Also, the password information may be more than one digit, and the above described process may be repeatedly performed by a number of the password information.

For example, when a predetermined number of the password information is '4', the above described processes may be required to be repeatedly performed four times to accurately input corresponding password information, whereby the authentication procedure may be completed.

Also, when inputting the password four times for the purpose of user authentication, a speed in which the character image, moved based on the movement information received from the external input unit, is displayed on the display unit may be changed, thereby preventing password tracking arising from the movement of the character image.

Also, when the character image is in contact with the obstacle image while the character image is being moved, the character image may be separated from the obstacle image by a predetermined distance, or may be suspended for a predetermined period of time.

In this instance, the determining unit 140 may determine that the character image is in contact with the obstacle image when the coordinate information of the character image and the coordinate information of the password image are matched with each other, and also determine whether the character image is in contact with the obstacle image using another algorithm for the above described image contact.

Also, to solve a problem of password hacking performed by momentarily capturing and analyzing the password image, the password image may be displayed only for the predetermined period of time.

Specifically, as an example, the password image may be displayed for 10 seconds when the predetermined period of time is 10 seconds, which may be sufficient time for a user to remember the password image, and then may be automatically cleared.

As another example, the password image may be automatically cleared when the character image approaches the password image, so that a corresponding password may not be displayed even though the password image is momentarily captured by a hacking program, thereby maintaining a security for the password.

Also, the character image may be re-positioned so as to re-perform the above described process when the movement information is not received from the external input unit for a predetermined period of time.

Also, when the user authentication procedure is performed within a predetermined period of time based on the password information corresponding to the password image being in contact with the character image, reward points may be provided to a user terminal where the user authentication procedure is completed.

Specifically, when inputting the password using a game within a limited time, reward points may be additionally provided to the user, thereby increasing the use of the password input service.

As described above, according to the present invention, the password may be inputted through the game using the apparatus 100 to thereby attract a user's interest, and the movement route of the character image may be diverse to thereby enhance the security level. A method for inputting a password using a game according to the present invention will be described in detail with reference to FIG. 5 based on a configuration of the apparatus 100, and thus repeated descriptions will be omitted.

Figure 5:
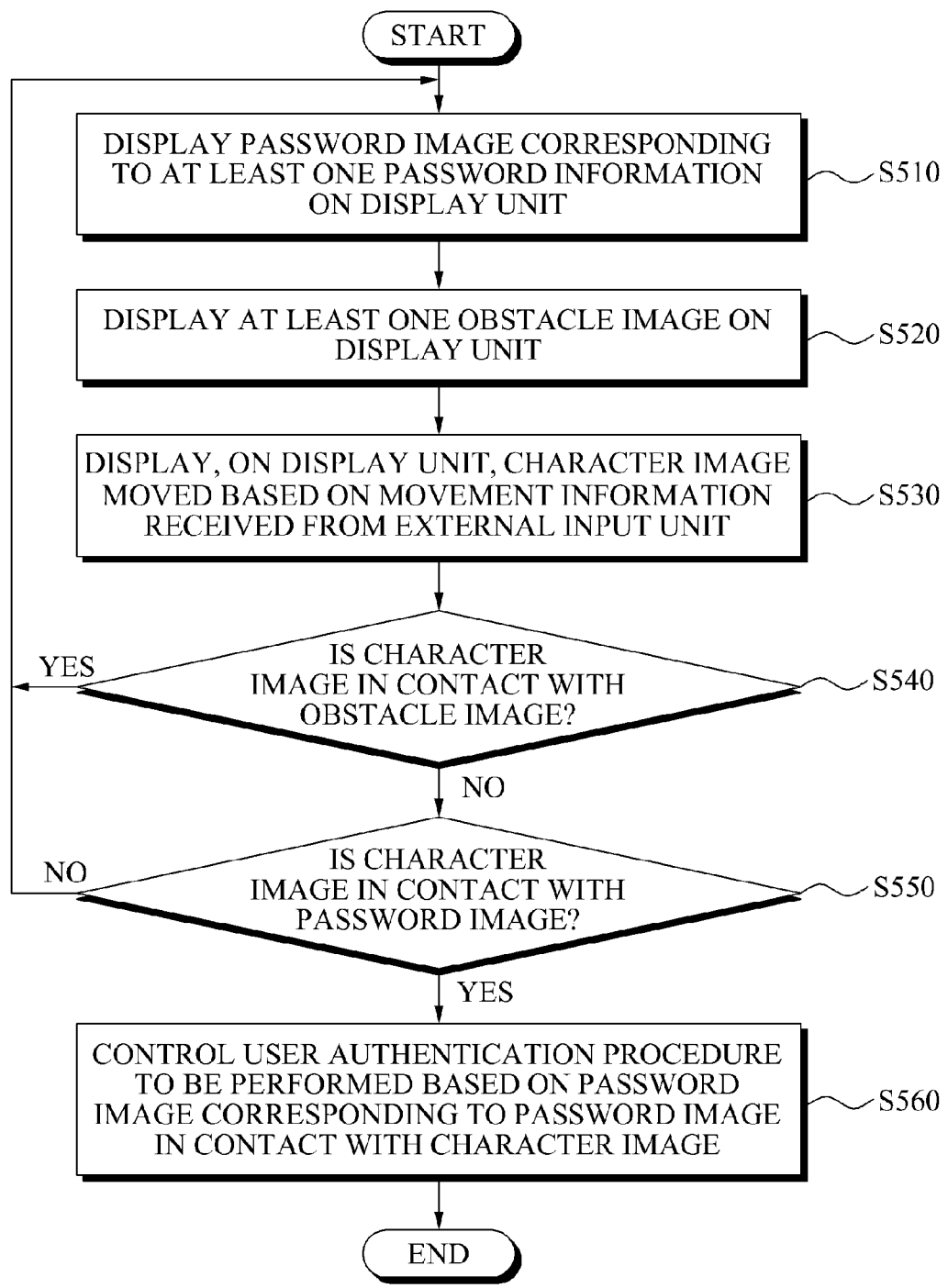
FIG. 5 is a flowchart illustrating a method for inputting a password using a game according to example embodiments.

FIG. 5 is a flowchart illustrating a method for inputting a password using a game according to example embodiments.

In operation S510, the password image displaying unit 110 may display, on the display unit, the password image corresponding to at least one password information.

In operation S520, the obstacle image displaying unit 120 may display, on the display unit, at least one obstacle image.

In operation S530, the character image displaying unit 130 may display, on the display unit, the character image moved based on the movement information received from the external input unit.

In operation S540, the determining unit 140 may determine whether the character image is in contact with the obstacle image. The character image may be determined to be in contact with the obstacle image when the coordinate information of the character image and the coordinate information of the obstacle image are matched with each other, the character image may be separated from the obstacle image by a predetermined distance, or may be suspended for a predetermined period of time in operation S550.

Next, in operation S560, the determining unit 140 may determine whether the character image is in contact with the password image. In operation S570, when the character image is in contact with the password image, the authentication unit 150 may control a user authentication procedure to be performed based on the password information corresponding to the password image being in contact with the character image.

In this instance, the password information may be more than one digit, and the above described operations may be repeatedly performed by a number of the password information.

Also, when the above described operations are repeatedly performed, a speed in which the character image, moved based on the movement information received from the external input unit, is displayed on the display unit may be changed.

As described above, according to the present invention, the password may be inputted using the game, thereby attracting a user's interest.

Also, according to the present invention, a generated location of the password may vary depending on a number of times the password is inputted in the game, thereby reducing a risk of hacking.

Also, according to the present invention, reward points may be provided when accurately inputting the password in the game, thereby increasing the use of a password input service.

The method for inputting the password using the game according to the above-described example embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for inputting a unique password using a game, the apparatus comprising:
a password image displaying unit to display, on a display unit, a password image corresponding to at least one password information;
an obstacle image displaying unit to display, on the display unit, at least one obstacle image, such that the at least one obstacle image and the password image are simultaneously displayed on the display unit;
a character image displaying unit to display, on the display unit, a character image moved based on movement information received from an external input unit;
a determining unit to determine whether the character image is in contact with the password image; and
an authentication unit to control a user authentication procedure to be performed based on the at least one password information corresponding to the password image when the character image is in contact with the password image, wherein the user authentication procedure determines whether or not a unique password is formed by the at least one password information corresponding to the contact of the character image with the password image.

2. The apparatus of claim 1, wherein the determining unit determines that the character image is in contact with the password image when coordinate information of the character image and coordinate information of the password image are matched with each other.

3. The apparatus of claim 1, wherein the password information is more than one digit, and the character image, moved based on the movement information received from the external input unit, is repeatedly displayed on the display unit by a number of the password information.

4. The apparatus of claim 3, wherein when the character image is repeatedly displayed, a speed in which the character image is displayed on the display unit is changed.

5. The apparatus of claim 1, wherein the determining unit determines whether the character image is in contact with the obstacle image, and when the character image is in contact with the obstacle image, the determining unit separates the character image from the obstacle image by a predetermined distance and displays the character image, or suspends the character image for a predetermined period of time and then displays the character image.

6. The apparatus of claim 5, wherein, when coordinate information of the character image and coordinate information of the obstacle image are matched with each other, the determining unit determines that the character image is in contact with the obstacle image.

7. The apparatus of claim 1, wherein the obstacle image is fixedly or movably displayed on an initially displayed location according to a predetermined setting.

8. The apparatus of claim 1, wherein the external input unit is anyone of a keyboard and a mouse.

9. The apparatus of claim 1, wherein the password image is displayed only for a determined period of time.

10. The apparatus of claim 1, wherein, when the user authentication procedure is performed within a predetermined period of time, the authentication unit controls to provide reward points with respect to a user terminal in which the user authentication procedure is completed.

11. A method for inputting a unique password using a game, the method comprising:
   displaying, on a display unit, a password image corresponding to at least one password information;
   displaying, on the display unit, at least one obstacle image, such that the at least one obstacle image and the password image are simultaneously displayed on the display unit;
   displaying, on the display unit, a character image moved based on movement Information received from an external input unit;
   determining whether the character image is in contact with the password image; and
   controlling a user authentication procedure to be performed based on the at least one password information corresponding to the password image when the character image is in contact with the password image, wherein the user authentication procedure comprises determining whether or not a unique password is formed by the at least one password information corresponding to the contact of the character image with the password image.

12. The method of claim 11, wherein the determining determines that the character image is in contact with the password image when coordinate information of the character image and coordinate information of the password image are matched with each other.

13. The method of claim 11, wherein, when the password information is more than one digit, and the displaying of the password image, the displaying of the at least one obstacle image, the displaying of the character image, the determining, and the controlling are repeatedly performed according to a number of the password information.

14. The method of claim 13, wherein, when the displaying of the password image, the displaying of the at least one obstacle image, the displaying of the character image, the determining, and the controlling are repeatedly performed, a speed in which the character image is displayed on the display unit is changed.

15. The method of claim 11, further comprising:
   determining whether the character image is in contact with the obstacle image; and
   when the character image is in contact with the obstacle image, separating the character image from the obstacle image by a predetermined distance and displaying the character image, or suspending the character image for a predetermined period of time and displaying the character image.

16. The method of claim 15, wherein, when coordinate information of the character image and coordinate information of the obstacle image are matched with each other, the determining of whether the character image is in contact with the obstacle image determines that the character image is in contact with the obstacle image.

17. The method of claim 11, wherein the obstacle image is fixedly or movably displayed on an initially displayed location according to a predetermined setting.

18. A non-transitory computer-readable medium having stored therein instructions executable by a client computing device to cause the client computing device to perform functions comprising:
   displaying, on a display unit, a password image corresponding to at least one password information;
   displaying, on the display unit, at least one obstacle image, such that the at least one obstacle image and the password image are simultaneously displayed on the display unit;
   displaying, on the display unit, a character image moved based on movement Information received from an external input unit;
   determining whether the character image is in contact with the password image; and
   controlling a user authentication procedure to be performed based on the at least one password information corresponding to the password image when the character image is in contact with the password image, wherein the user authentication procedure determines whether or not a unique password is formed by the at least one password information corresponding to the contact of the character image with the password image.

* * * * *